Sept. 8, 1936.  A. H. STEWART  2,053,381

GLASS FEEDING METHOD AND APPARATUS

Original Filed Nov. 23, 1934   3 Sheets-Sheet 1

INVENTOR
Andrew H. Stewart,
By Archworth Martin,
Attorney.

Sept. 8, 1936.  A. H. STEWART  2,053,381
GLASS FEEDING METHOD AND APPARATUS
Original Filed Nov. 23, 1934    3 Sheets-Sheet 3

INVENTOR
Andrew H. Stewart,
By Archworth Martin,
Attorney.

Patented Sept. 8, 1936

2,053,381

UNITED STATES PATENT OFFICE 2,053,381

GLASS FEEDING METHOD AND APPARATUS

Andrew H. Stewart, Shields, Pa., assignor to Ball Brothers Company, Muncie, Ind., a corporation of Indiana Application November 23, 1934, Serial No. 754,503
Renewed July 25, 1936

13 Claims. (Cl. 49—55)

My invention relates to the feeding and forming of small masses of glass or other molten metal to be employed as mold charges, and constitutes, in part, a continuation in part of my application Serial No. 711,742, filed February 17, 1934.

In the supplying of molten glass to forming molds from a batch of molten glass, various methods have been employed in order to produce mold charges of proper size and shape. Some of these methods involve the flowing of the glass through a spout or orifice to the molds, the flow of the stream being periodically interrupted to permit successive molds to be brought into glass-receiving position.

Difficulty has been experienced in providing a suitable valve or retarding device which would operate without smearing the glass at the discharge orifice, and the gradual choking of such orifice through chilling of the glass. Another objection arose from the fact that the glass was frequently deposited in a mold in a strung-out condition, which resulted in laps and seams in the finished article.

Other methods involve the use of apparatus of the air feeder type, wherein pressure and suction are applied alternately to the surface of the glass at the feeding orifice, in order to effect expulsive and retractive impulses, a severing shear being actuated in timed relation to such impulses. Expulsive and retractive impulses have also been secured by vertically reciprocating a plunger at the orifice.

These methods have a number of objections, among which is the excessive agitation of the glass above the orifice, which produces swirls that make for irregularity in the shape of the charges which are sheared at the lower side of the orifice, and which cause colder portions of the glass to be intermingled with hotter portions, as the glass is being discharged through the orifice. Again, surface impurities are caused to be carried through the orifice.

My invention has for its object the provision of a method and apparatus, whereby accurately-formed charges of glass are secured, without the objectionable features above-referred to.

Another object of my invention is to provide means whereby the advantages of a gravity flow are secured, and whereby intermittent flow through the feeding orifice is more effectively controlled than in various prior art structures.

Figure 1:
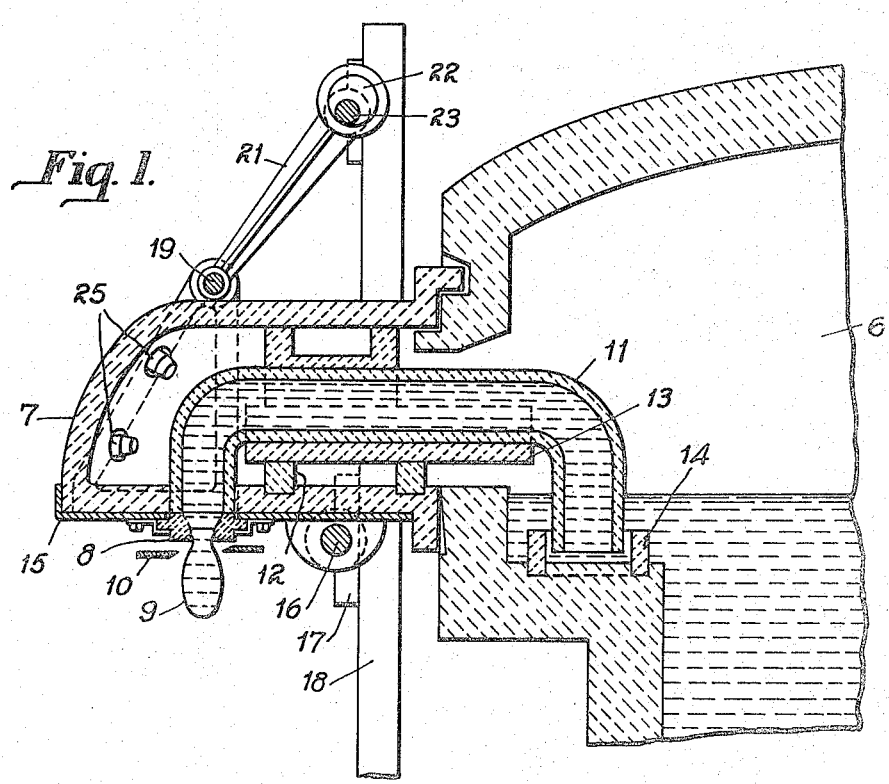
Figure 2:
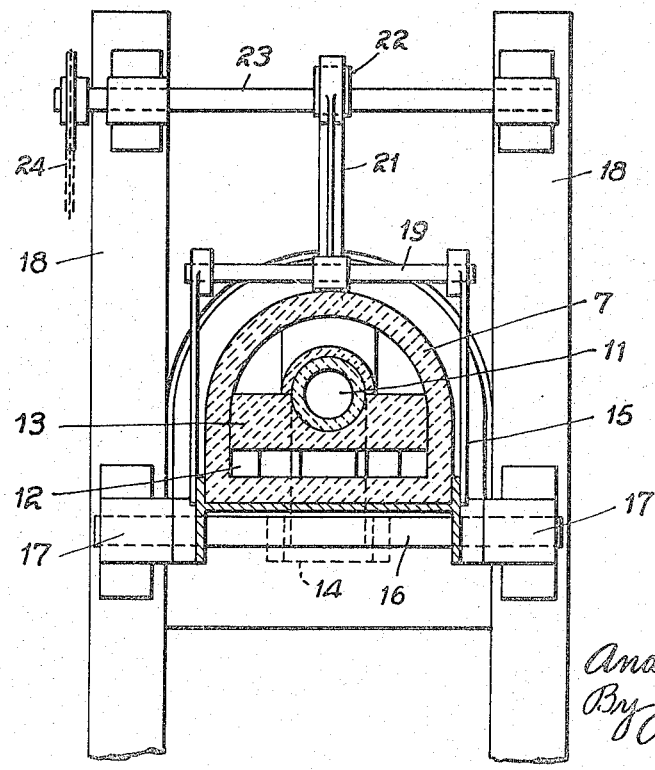
Figure 3:
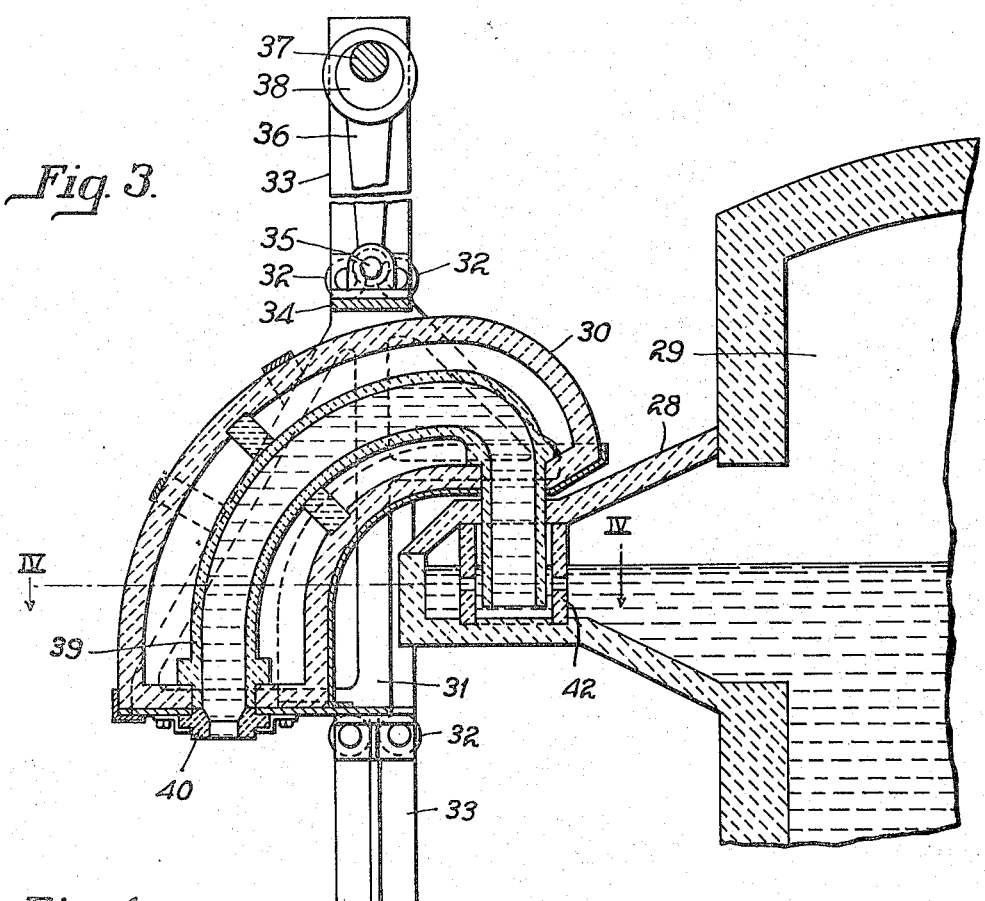
Figure 4:
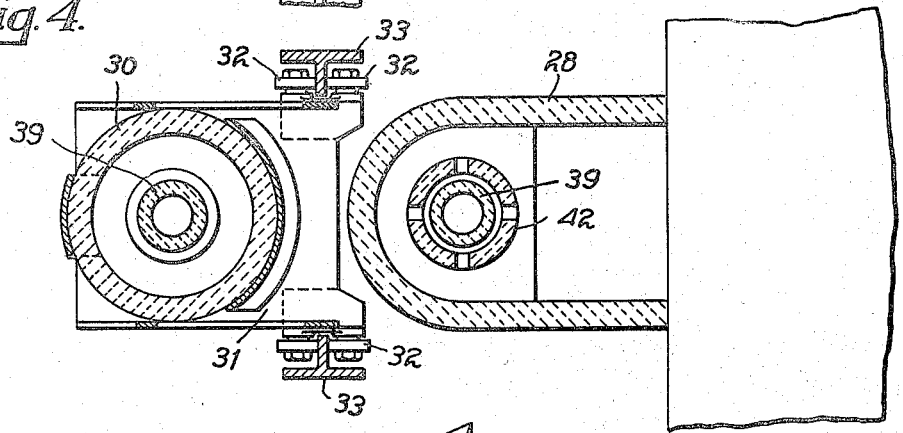
Figure 5:
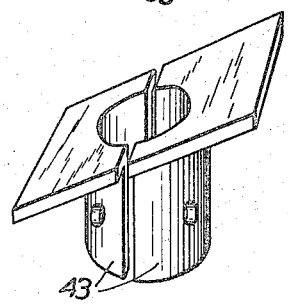
Figure 6:
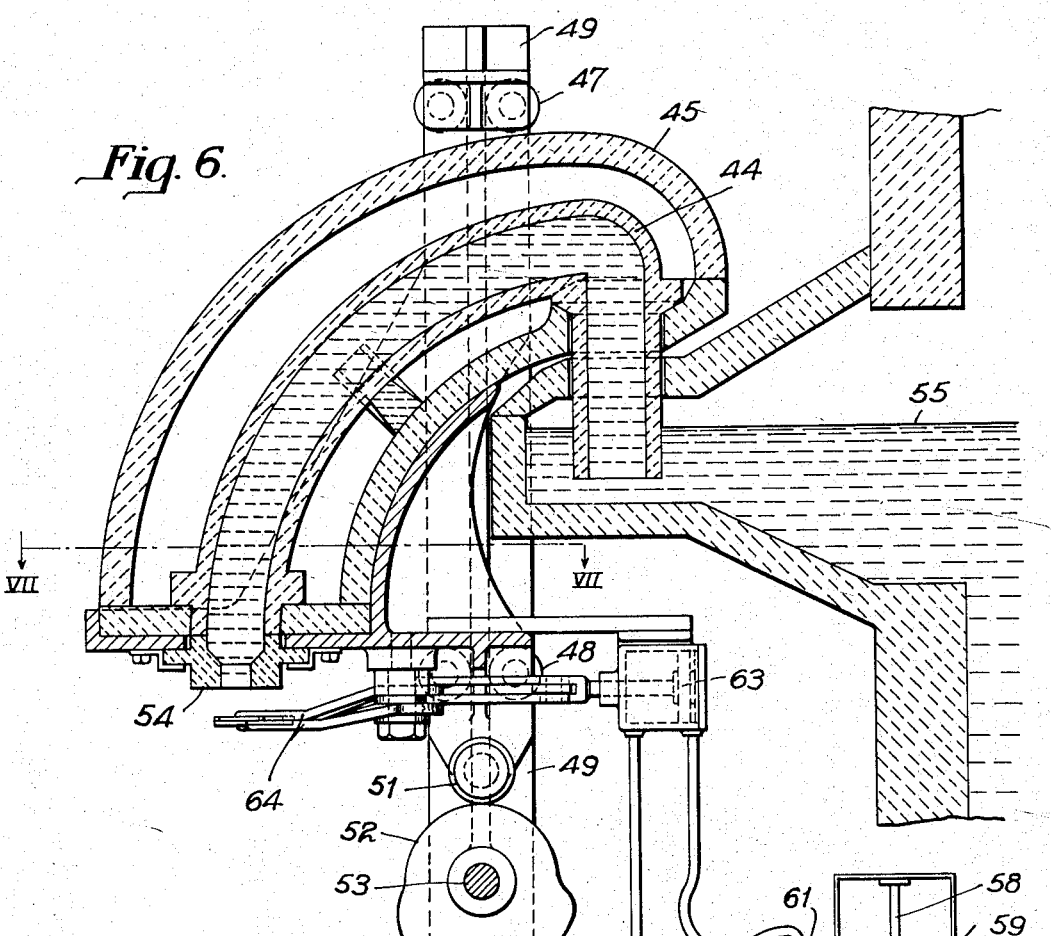
Figure 7:
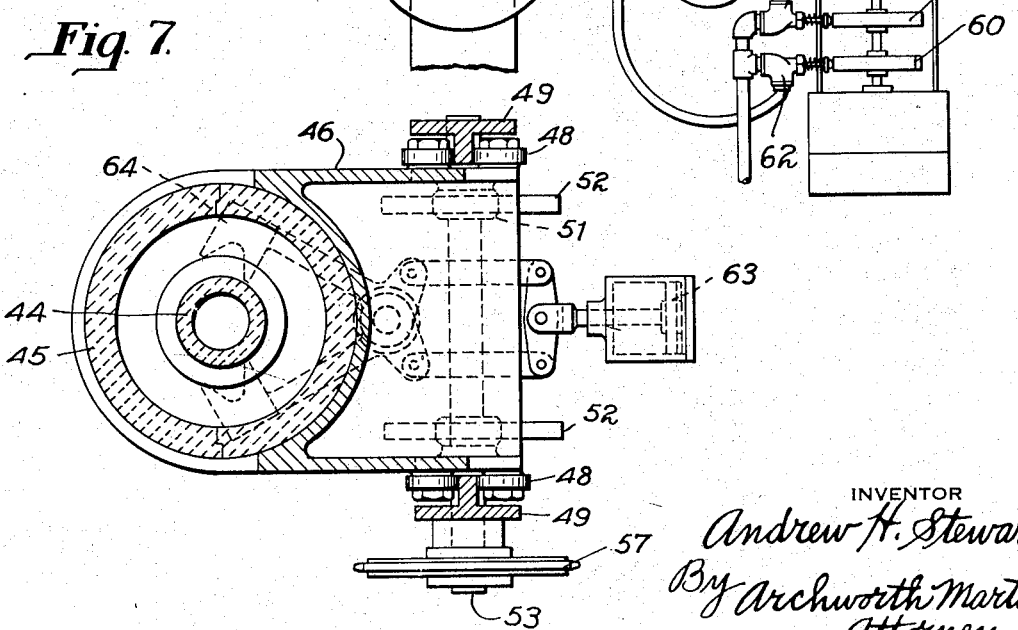

Some of the devices for practising my invention are shown in the accompanying drawings, wherein Figure 1 is a longitudinal sectional view, through a portion of a glass furnace and feeding apparatus; Fig. 2 is a cross-sectional view of the structure of Fig. 1; Fig. 3 is a view similar to Fig. 1, but showing a modified form of apparatus; Fig. 4 is a view taken on the line IV—IV of Fig. 3; Fig. 5 is a perspective view of an adjustable ring for controlling flow of glass to the siphon tube of Fig. 3; Fig. 6 shows a modification of the structure of Fig. 3, and Fig. 7 is a view taken on the line VII—VII of Fig. 6.

Referring first to Figs. 1 and 2, the refining end of a glass furnace is indicated by the numeral 6, and the furnace may be of somewhat the usual form, but modified at its front end somewhat to accommodate it to a nose block or housing 7. The housing 7 is provided with an orifice bushing 8, through which the glass is caused to flow intermittently to form mold charges 9 which are sheared by shear blades 10. The blades 10 may be operated in any well-known manner.

A conduit 11, preferably of clay, which is made as a unit or in sections which are fused together, is supported in the housing 7, upon blocks 12 and a trough-like holder 13. The outer end of the tube 11 has snug engagement with the bushing 8, and its inner end extends into the body of molten glass, and is encompassed by a clay ring or sleeve 14, sufficient clearance being provided between the periphery of the conduit and the sleeve to permit flow of glass into the lower end of the conduit.

The housing 7 is carried by a frame 15 that is mounted on a rock shaft 16 which is carried in bearing blocks or brackets 17 which are secured to uprights 18. A shaft 19 is mounted on the upper part of the frame 15 and has connection with an eccentric rod 21. An eccentric 22 is disposed within the upper end of the eccentric rod, and is secured to a shaft 23 that is journaled in the uprights 18. The shaft 23 and the eccentric 22 are driven through a sprocket 24 from any suitable source of power, and in timed relation to the operation of the shear blades 10.

The inner end of the housing 7 has loose fit with the front wall of the furnace 6, so that it may have tilting movements relative to said wall.

It will be seen that as the shaft 23 is rotated, the housing 7 and the conduit 11 will be oscillated about the axis of the shaft 16, and that its inner end will have a generally vertical movement with respect to the ring 14. The outer or discharge end of the conduit 11 is lower than the glass level within the tank, so that the conduit will function as a siphon, to cause flow of glass from the tank to the orifice bushing 8, where mold charges are periodically sheared from the glass stream.

It is desirable that the flow of glass be periodically checked or retarded at the time of shearing, and in order to secure this result, I have the eccentric driving mechanism so synchronized with the shears that the outer end of the conduit 11 is lowered slightly, just previous to or at the time of shearing. This lowering movement, of course, causes the inner end of the conduit 11 to rise, thus producing a slight backward pull on the stream of glass within the conduit. The backward pull results from the fact that communication between the inner end of the conduit and the body of molten glass is partially restricted by the ring 14. The retractive impulse can be of sufficient intensity to produce some necking of the charge 9, or can be sufficient merely to check the flow, while the shearing operation is being performed.

The eccentric 22 is preferably continuously movable, and is of such contour that tilting of the housing in the opposite direction which again lowers the inner end of the conduit 11 in the ring 14, is at a rate of movement corresponding to the rate at which the glass flows through the conduit under the siphonic action. The glass is therefore not unduly agitated, as would be the case if an expulsive force where applied thereto. Furthermore, suspended charges of more symmetrical form will be produced.

The apparatus as shown, can be utilized in forming mold charges of various sizes merely by using orifice bushings of different diameters.

The temperature of the glass within the conduit 11 is controlled by gas flames from nozzles 25, or by the introduction by cooling air through such nozzles. The heating flames will not, therefore, come in direct contact with the glass, and since the inner end of the conduit 11 is supplied with glass from an intermediate plane of the glass pool, there is practically no danger of impurities from the surface of the glass or from the bottom of the tank finding their way into the conduit. Heating of the conduit could be by means of electrical resistance elements placed in the housing 7.

Referring now to Figs. 3 and 4, I show a structure wherein a boot 28 has communication with the refining end 29 of a furnace. A housing 30 is supported upon a frame 31 that is provided with rollers 32 that engage the stems of vertically-disposed T rails 33 which serve as vertical guides. The upper end of the frame 31 is provided with a cross bar 34 which has a shaft 35 to which the eccentric rod 36 is connected. A shaft 37 is mounted in the upper ends of the guide rails 33 and carries an eccentric 38 which has operative engagement with the eccentric arm 36. The shaft 37 is driven in any suitable manner, as in the case of the shaft 23 of Fig. 2, to raise and lower the frame 31 and the housing 30 carried thereby. The rollers 32 insure linear vertical movements of the housing.

A siphon tube or conduit 39 is supported in the housing 30, and the temperature thereof may be controlled by burners or air jets or electric heat as is the conduit 11 of Fig. 1. The outer end of the conduit 39 has close engagement with an orifice bushing 40, and its inner end extends into a ring 42 that is mounted on the floor of the boot 28. The ring 42 extends above the glass level, but is provided with lateral openings through which the glass may flow to the intake end of the conduit 39. The operation of this apparatus is quite similar to that of Figs. 1 and 2, in that the outer end of the conduit 39 is sufficiently low to enable it to function as a siphon. The housing 30 is periodically raised by the eccentric 38 to produce a backward force on the glass in the conduit, and it is lowered at a rate of speed dependent upon the rate of gravity flow of the glass. The bearings for the shaft 37 may be made vertically adjustable in the uprights 33, or the uprights themselves may be adjusted vertically to vary the relative positions of the conduit and the holes in the ring 42, and hence to vary the degree of suctional impulses.

In Fig. 5 I show a split ring or sleeve 43 which may be employed to encircle the intake end of the siphon tube 39 of Fig. 3. The halves of the ring are adjustable relative to each other in directions radially of the siphon tube, whereby the desired clearance between the adjacent edges of the ring is obtained, so as to control the flow of glass to the siphon tube. The ring sections may be integrally formed with the top covering blocks of the boot in which the ring is installed, and the split formation thereof will facilitate such installation. In such case, the ring 43 need not engage with the bottom of the forehearth, since it may be desirable to provide for flow of glass beneath the lower edge of the ring.

Not only will the weight of the suspended charge or gob depend somewhat upon the size of the orifice bushing, but variations in the weight or size of the gob can further be controlled by varying the rate at which the conduit is raised and lowered, and the range of vertical movements thereof.

Pulsations in the conduit can be produced to some degree independently of the rings 14 and 42, and a quick upward movement of the outer end of the conduit will produce some necking of the gob independently of suction applied at the inner end of the tube, and supplemental to the necking which would occur under mere gravity movement of the suspended charge, somewhat after the manner in which a hand gatherer will give a quick upward motion to his punty, in order to assist the necking of the suspended gob at the point of shearing. In the present case, the molten glass, by reason of its frictional engagement with the orifice ring and the conduit and reduced siphon action, will tend to pull away from that portion of the glass which has emerged from the orifice bushing.

Referring now to Figs. 6 and 7, I show a structure which is quite similar to those of Figs. 1 and 3, but wherein no rings or sleeves corresponding to the members 14 and 42 are employed. In this arrangement, the siphon conduit 44, together with the housing 45, are periodically raised and lowered in timed relation to the shearing operation, somewhat after the manner of operation in the structures of Figs. 3 and 4. The housing 45 is supported from a frame 46 that carries rollers 47 and 48 which engage vertical guide rails 49.

The frame 46 carries rollers 51 which are engaged by cams 52 that are rotated to periodically raise and lower the frame 46 and the siphon tube 44 carried thereby. The cams 52 are secured to a shaft 53 that may suitably be journalled in lower portions of the vertical guide rails 49.

As heretofore stated, the siphon, without the use of a restricting ring or sleeve at its inner end, will function in somewhat the same manner as the siphons of Figs. 1 and 3. Where the sleeve is eliminated, however, as in Fig. 6, there will, of course, be a reduction of impulsive forces on the glass within the siphon, because of the absence of restriction at the inner end of the tube 44. However, downward or lowering movement of the tube will produce some acceleration to glass flow, in addition to the lowering of the orifice 54 relative to the pool level 55.

At the end of the downward stroke, the suspended mass of glass will continue to move, and there will be tendency for the same to draw in or neck, and this necking operation can be accelerated by raising the siphon tube sharply, by reason of the frictional action of the tube and the orifice ring on the glass and the reduced siphonic action. The degree of necking, as well as the rate at which the necking is effected will, of course, depend somewhat upon the rate at which the tube is raised.

The shearing is, of course, effected in timed relation to the raising of the siphon tube, and ordinarily the tube will be still on its upward travel at the time of shearing, so that the glass above the shears will be given an upward motion after shearing, by the "drag" exerted by the body of glass at the inner end of the tube, and also will, through natural surface tension action of the glass strip, tend to draw back toward the orifice ring 54. Objectionable "piling" of the glass stream on the shear is thereby overcome.

The cam shaft 53 may be driven by a sprocket wheel 57 that may have driving connection with a timer shaft 58, or the shafts 53 and 58 can be driven in any other suitable manner from a common source of power, so that there will be properly timed relation between the vertical movements of the siphon tube and the shearing operations.

The timer may be of any well-known form, and includes a pair of cam discs 59 and 60 that control valves 61 and 62, for admitting pressure alternately to opposite sides of a shear-operating piston 63, in a manner well-known in the art, the piston being connected through suitable linkage or toggle mechanism to the shears 64 that are mounted on the frame 46. Since the shears and the siphon tube are both carried on the vertically-movable frame 46, the shears will always be in proper position with respect to the orifice 54. The cylinder for the shear-operating piston 63 is likewise secured to the frame 46.

I claim as my invention:—

1. The method of feeding glass, which comprises creating a gravity flow of glass from a molten bath, through a siphon conduit, with the glass at such temperature as to form suspended masses at the discharge end of the conduit, periodically retarding the flow, and shearing mold charges from the suspended glass.

2. The method of feeding glass, which comprises creating a gravity flow of glass from a molten bath, through a siphon conduit, with the glass at such temperature as to form suspended masses at the discharge end of the conduit, periodically imparting retractive movement to the glass in the conduit, and shearing mold charges from the suspended glass.

3. The combination with a container for a pool of molten glass, of a siphon conduit having one end extending into the glass, and its other end discharging at a plane below the glass level, a sleeve surrounding the inner end of the conduit, but arranged to permit restricted flow of glass from the pool to the conduit, and means for periodically shifting the inner end of the conduit in directions axially of the sleeve.

4. Apparatus for supplying mold charges from a pool of molten glass, comprising a conduit having its inner end arranged to extend into the molten glass, a shear positioned below the outer end of the conduit, and means operating in timed relation to the shear for raising and lowering the conduit.

5. Apparatus for supplying mold charges from a pool of molten glass, comprising a conduit having its inner end arranged to extend into the molten glass, a shear positioned below the outer end of the conduit, and means operating in timed relation to the shear for raising and lowering one end of the conduit.

6. Apparatus for supplying mold charges from a pool of molten glass, comprising a conduit having its inner end arranged to extend into the molten glass, a shear positioned below the outer end of the conduit, and means operating in timed relation to the shear for raising and lowering the conduit and the shear, as a unit.

7. The method of feeding glass, which comprises creating a gravity flow of glass from a molten bath, through a siphon conduit, with the glass at such temperature as to form suspended masses at the discharge end of the conduit, periodically imparting retractive movement to the glass in the conduit, and shearing mold charges from the suspended glass, during said retractive movement.

8. The method of feeding glass, which comprises creating a gravity flow of glass from a molten bath, through a siphon conduit, with the glass at such temperature as to form suspended masses at the discharge end of the conduit, periodically imparting upward movement to the siphon, and simultaneously shearing mold charges from the suspended mass.

9. Apparatus for supplying mold charges from a pool of molten glass, comprising a conduit positioned to conduct a stream of glass from a pool, a shear positioned below the discharge end of the conduit, a frame supporting the conduit, and means operating in timed relation to operation of the shear, for raising and lowering the said frame.

10. Apparatus for supplying mold charges from a pool of molten glass, comprising a conduit positioned to conduct a stream of glass from a pool, a shear positioned below the discharge end of the conduit, a frame supporting the conduit and the shear, and means operating in timed relation to operation of the shear, for raising and lowering the said frame.

11. A method of feeding glass in the form of a succession of separate mold charges, which consists in establishing a syphonic flow of molten glass from a body of such glass and in the form of a depending stream, periodically varying the syphonic head occasioning such flow and severing such depending stream in timed relation with such variation.

12. In combination with a container for a pool of molten glass, a syphonic conduit having its receiving end extending into the pool of glass in said container and its discharge end extending free of said container and located below the level of the glass of such pool, means for periodically moving said tube to vary the syphonic action thereof and a severing mechanism operating in timed relation with such means for severing the stream of glass issuing from such tube.

13. In combination with a container for a body of molten glass, a syphon conduit having its receiving end extending into the body of glass in said container and its discharge end extending free of said container and located below the level of said body of glass, means for varying the syphonic flow through said conduit, a severing mechanism located adjacent the discharge end of said conduit and means for operating said shear mechanism in timed relation with said first mentioned means.

ANDREW H. STEWART.